US007967890B2

(12) United States Patent
Anderson et al.

(10) Patent No.: US 7,967,890 B2
(45) Date of Patent: Jun. 28, 2011

(54) PRODUCING NANOPARTICLES USING NANOSCALE POLYMER TEMPLATES

(75) Inventors: Darren Anderson, Toronto (CA); Jose Amado Dinglasan, Toronto (CA); Nikolai Loukine, Toronto (CA)

(73) Assignee: Vive Nano, Inc., Toronto (CA)

( * ) Notice: Subject to any disclaimer, the term of this patent is extended or adjusted under 35 U.S.C. 154(b) by 0 days.

(21) Appl. No.: 12/631,226

(22) Filed: Dec. 4, 2009

(65) Prior Publication Data

US 2010/0148398 A1 Jun. 17, 2010

Related U.S. Application Data

(62) Division of application No. 12/116,877, filed on May 7, 2008, now Pat. No. 7,645,318.

(51) Int. Cl.
*B22F 9/20* (2006.01)
(52) U.S. Cl. ........... 75/343; 75/345; 75/363; 525/330.9; 525/329.1; 525/329.4; 525/329.9
(58) Field of Classification Search ............ 75/343, 75/345, 363; 525/330.9, 329.1, 329.4, 329.9
See application file for complete search history.

(56) References Cited

U.S. PATENT DOCUMENTS

| 6,680,013 | B1 * | 1/2004 | Stein et al. ................ 264/44 |
| 6,721,083 | B2 * | 4/2004 | Jacobson et al. ........... 359/296 |
| 7,189,279 | B2 * | 3/2007 | Guillet ......................... 75/343 |
| 7,319,127 | B2 | 1/2008 | Kim et al. |
| 2003/0124194 | A1 | 7/2003 | Gaw et al. |
| 2005/0245658 | A1 * | 11/2005 | Mehrotra et al. ............ 524/430 |
| 2005/0255629 | A1 * | 11/2005 | Han et al. .................... 438/104 |
| 2006/0083694 | A1 * | 4/2006 | Kodas et al. .................. 424/46 |
| 2008/0032132 | A1 * | 2/2008 | Woodfield et al. .......... 428/402 |
| 2009/0093582 | A1 * | 4/2009 | Zhang et al. ................. 524/496 |

FOREIGN PATENT DOCUMENTS

| CA | 2483309 A1 | 11/2003 |
| CA | 2563995 A1 | 11/2005 |
| CA | 2625880 A1 | 4/2007 |
| WO | WO-2006076636 A1 | 7/2006 |
| WO | WO-2007000014 A1 | 1/2007 |
| WO | WO-2009/135325 A1 * | 11/2009 |

OTHER PUBLICATIONS

ISR and Written Opinion for PCT/CA2009/000706 (Sep. 2, 2009).

* cited by examiner

*Primary Examiner* — Peter D. Mulcahy
*Assistant Examiner* — Henry Hu
(74) *Attorney, Agent, or Firm* — Choate Hall & Stewart LLP

(57) ABSTRACT

In various aspects provided are methods for producing a nanoparticle within a cross-linked, collapsed polymeric material. In various embodiments, the methods comprise (a) providing a shape-static polymer template with a size in the range between about 1 nm to about 100 nm; (b)) incorporating one or more nanoparticle precursor moieties with the shape-static polymer template; and either (c) oxidizing the precursor moieties to form a composite nanoparticle comprising one or more of an inorganic oxide and hydroxide nanoparticle; or (c) adding an ion with an opposite charge polarity to the at least one nanoparticle precursor moieties to effect formation of a composite nanoparticle.

7 Claims, 3 Drawing Sheets

PRODUCING NANOPARTICLES USING NANOSCALE POLYMER TEMPLATES

CROSS-REFERENCE TO RELATED APPLICATIONS

This application is a divisional of U.S. application Ser. No. 12/116,877 filed May 7, 2008, the entire contents of which are incorporated herein by reference.

BACKGROUND OF THE INVENTION

Nanoparticles are nanometer-sized materials e.g., metals, semiconductors, polymers, and the like, that can often posses unique characteristics because of their small size. Nanoparticles are of particular interest because of their potential for use as catalysts, photocatalysts, adsorbents, sensors, and ferrofluids, as well as for their material properties for application to optical, electronic, and magnetic devices, and formulation of plastics and other materials. Accordingly, there is a desire for generalizable methods of directly producing metallic, metallic alloyed, semiconductor, oxide, and other forms of nanocomposite particles having effective functionality in a multitude of scientific disciplines.

In practical application, however, the usefulness of a nanoparticle depends on more than just the properties exhibited in the laboratory. In practical application many interesting laboratory properties may not be realized due to interferents and undesired reactions with chemicals in the application environment.

SUMMARY OF THE INVENTION

In various aspects, the present invention provides methods of producing a composite nanoparticle comprising a nanoparticle confined within or associated with a shape-static polymeric material, which is itself a nanoparticle. In various embodiments, the shape-static polymeric material imparts properties to the inorganic nanoparticle. For example, in various embodiments an inorganic nanoparticle can be produced inside a shape-static polymeric material that comprises a polyelectrolyte, forming an inorganic nanoparticle that is stabilized by a polyelectrolyte that, e.g., can provide improved dispersibility in aqueous solution.

In various aspects, the present inventions provide methods for producing a composite nanoparticle comprising the steps of: (a) providing a shape-static polymer template with a size in the range between about 1 nanometer (nm) to about 100 nanometers (nm); (b) incorporating one or more nanoparticle precursor moieties with the shape-static polymer template; (c) modifying at least a portion of the one or more nanoparticle precursor moieties to form one or more nanoparticles and thereby form a composite nanoparticle.

As used herein, the term "composite nanoparticle" refers to a nanoparticle confined substantially within or associated with a shape-static polymer template.

As used herein the term "polymer template" refers to a polymer molecule or combination of polymer molecules that are discretely dispersed in solution such that they do not substantially aggregate or agglomerate. A "shape-static" polymer template is a polymer template which does not substantially change its size and does not substantially change its shape when a composite nanoparticle is formed from said polymer template.

A shape-static polymer template can comprise a single polymer molecule or a combination of two or more polymer molecules. When a polymer template comprises two or more polymer molecules the polymer molecules can comprise substantially the same or substantially different monomer units. For example, in various embodiments a shape-static polymer template comprises a first type of polymer molecule comprising monomers A and a second type of polymer molecule comprising monomers B and C, e.g., a block co-polymer. In various embodiments, a shape-static polymer template comprises a first type of polymer molecule comprising monomers of A and a second identical polymer molecule comprising monomers of A.

In various preferred embodiments, the polymer template comprises chemical groups that have affinity for the nanoparticle precursor moieties. Examples of suitable chemical groups include, but are not limited to, ionizable groups such as carboxyl, amine, sulfonate, or other chemical groups that have an affinity for oppositely charged ionic species. For example, chemical groups such as thiols, which have affinities for noble metals such as silver and gold moieties are preferred in various embodiments; in various embodiments coordinating groups which have affinities for polyvalent ions are preferred. Non-limiting examples of suitable polymeric materials for use as polymer templates are discussed herein, and but can be synthetic or naturally occurring and can be linear, branched, hyperbranched, and/or dendrimeric.

The affinity interaction between a shape-static polymer template and a nanoparticle precursor can occur through one or more types of interactions including, but not limited to, covalent bonding, ionic bonding, hydrogen bonding, electrostatic interaction, van der Waals forces, etc. and combinations thereof.

Suitable nanoparticle precursors of use in the present inventions include species that have an affinity for the shape-static polymer template and that can be modified to form a nanoparticle that is associated with the shape-static polymer template. Examples of nanoparticle precursors include, but are not limited to, ionic species such as cations and anions, where, e.g., the ions can be polyvalent; complexes such as, e.g., a metal cyanide complex; clusters containing nanoparticle precursor groups that have an affinity for the shape-static polymer template, e.g., organogold complexes soluble in a solvent system in which the shape-static polymer template can be dissolved and for which the organogold complex has an affinity, e.g., e polymer template comprising a thiol group.

Suitable modifying steps of use in various embodiments of the present inventions include, but are not limited to, chemical treatments that can transform the nanoparticle precursor into a nanoparticle. For example, reduction using radiation or chemical treatment, decomposition of a complex using heat, oxidation using chemical treatment, and/or precipitation, e.g., through addition of a counterion to the nanoparticle precursor, where the product is substantially insoluble in the solvent but can form a stable dispersion, e.g., because of the presence of the polymer template.

In various aspects, the present inventions provide methods for providing non-composite nanoparticles from the aforesaid composite nanoparticles. In various embodiments, this can be done by wholly or partially removing the polymer template from the resulting composite nanoparticle using, e.g., pyrolysis in a reducing atmosphere and/or using a high flux of ultraviolet light to perform chain scission on a polymer template.

BRIEF DESCRIPTION OF THE DRAWINGS

The foregoing and other aspects, embodiments, objects, features and advantages of the present inventions can be more fully understood from the description in conjunction with the accompanying drawings. In the drawings, like reference characters generally refer to like features and structural elements throughout the various figures. The drawings are not necessarily to scale, emphasis instead being placed upon illustrating the principles of the present inventions.

DESCRIPTION OF VARIOUS EMBODIMENTS

Figure 1:
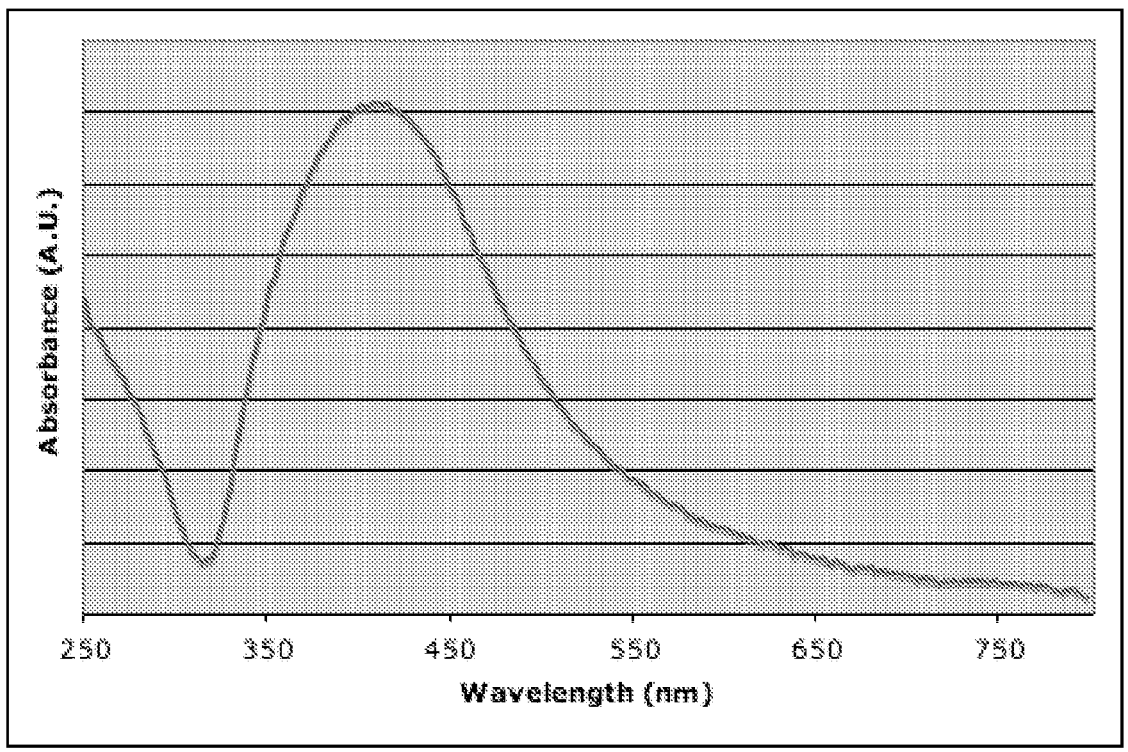
FIG. 1: The UV-Vis absorbance spectrum of silver nanoparticles prepared according to the present invention, with the characteristic plasmon absorbance shown.

Prior to further describing the present inventions, it may be helpful to provide a general discussion of the usage of terms herein.

As used herein, the term "precursor moiety" refers to a compound or entity at least a portion of which is a component of the eventual nanoparticle formed and includes nanoparticle precursors. By the term "metal species-containing compound" is meant a compound containing a metal or metalloid in any valence state. As used herein, the term "with" includes into, attached to and combinations thereof.

A. Composite Nanoparticles

In various embodiments, a composite nanoparticle of the present inventions and/or formed by a method of the present inventions has a mean diameter in the range between about 1 nanometer (nm) to about 100 nm. In various embodiments, the composite nanoparticle has a mean diameter in one or more of the ranges between: (a) about 1 nm to about 10 nm; (b) about 10 nm to about 30 nm; (c) about 15 nm to about 50 nm; and (d) about 50 nm to about 100 nm). It is to be understood that the term "mean diameter" is not meant to imply any sort of specific symmetry (e.g., spherical, ellipsoidal, etc.) of a composite nanoparticle.

In various practical applications of nanoparticles, nanoparticle interaction with deactivating compounds, solubility, and/or unwanted aggregation can be a problem. In various embodiments of the present inventions, nanoparticle compositions are provided having a polymer template that provides dispersibility and/or prevents aggregation, but allows transport of materials from the nanoparticle environment to the nanoparticle surface and vice versa. In various versions, such embodiments can have practical application in the areas, e.g., of slow-release pharmaceuticals, agrochemicals, corrosion inhibitors, and the like, where the nanoparticle comprises an active agent that is to be released. Modifications to the polymer template can be used to provide nanoparticle compositions with tailored release profiles (such as, e.g., controlled release, sustained release, delayed release, etc); transport rates to the nanoparticle and/or away from the nanoparticle.

In various embodiments of the present invention, the composite nanoparticles of the present inventions facilitate providing and/or provide improved optical properties, such as narrower emission spectra, improved fluorescence efficiency, modified fluorescence lifetimes, and the like compared to substantially similar nanoparticles without a stabilizer layer.

B. Polymer Template

The composite nanoparticles of the present inventions comprise a nanoparticle preferably surrounded by or associated with at least one polymer molecule moiety that forms a shape-static polymer template. The shape-static polymer template must have chemical functionality that allows a nanoparticle precursor to associate with the template. Examples of appropriate functionality include, but are not limited to, ionizable groups such as carboxylic acids, amines, sulfonic acids, amino acids, and the like. Other examples of appropriate functionality include chemical groups that have a preference for specific ionic species in solution, e.g., thiols where the nanoparticle precursor comprises a gold moiety.

In various preferred embodiments, the shape-static polymer template comprises one or more polymers with ionizable or ionized groups. An ionizable moiety or group is any chemical functional group that can be rendered charged by adjusting solution conditions, while ionized moieties refers to chemical functional groups that are charged regardless of solution conditions. An ionizable moiety also includes any chemical functional group that can be rendered charged by the use of radiation or by the use of a static electromagnetic field. The ionized or ionizable moiety or group can be either cationic or anionic, and can be continuous along an entire chain as in the case of regular polymers, or can be interrupted by blocks containing different functional groups, as in the case of block polymers.

Examples of polymer template polymer molecules suitable in various embodiments include, but are not limited to, polyelectrolytes i.e. polymers comprising multiple ionizable moieties such as cationic or anionic groups. In various embodiments, a preferred cationic group is the amino group and preferred anionic groups are carboxylic acid, sulfonic acid, phosphates, and the like. For cationic polymers, examples include, but are not limited to, poly(allylamine), poly(ethyleneimine), chitosan, poly(diallyldimethylammonium chloride), and poly(lysine). For anionic polymers, examples include, but are not limited to, poly(acrylic acid), poly(styrene sulfonic acid), poly(glutamic acid), etc. Block polymers are made up of blocks of polymers having different functional groups. The block polymers can be made up of blocks of monomers of any of the mentioned anionic and cationic polymers or other similarly charged monomers and another polymer that imparts a specific desirable property to the block polymer.

A wide variety of solvents can be used to form a polymeric template solution of use in the present inventions. In various embodiments, the polymeric solution is preferably an aqueous solution.

The polymer template of use in the present invention can be produced using polymer collapse as disclosed, e.g., in International application number PCT/CA2006/001686 to Goh et al., the entire contents of which are incorporated herein by reference. A polymer template can be produced by polymerization of a polymer precursor in environments where a suitable number of precursors can polymerize without forming aggregates or agglomerates, and where the resulting polymer does not aggregate or agglomerate with other polymers due to electrostatic or steric repulsion. In various embodiments, a polymer template can be produced by polymerization of the polymer precursor around a biomolecule or inorganic template, followed by etching of the biomolecule or inorganic template. In various embodiments, the template can be produced by assembly of small molecular-weight polyelectrolytes around an inorganic template with terminal charged groups in a layer-by-layer fashion, followed by cross-linking of the polyelectrolytes and etching of the inorganic template.

The production of a shape-static polymer template from the polymer template can be effected in a variety of ways. In various embodiments, the polymer template is sufficiently crosslinked as to maintain its shape during production of the nanoparticle. In various embodiments, the polymer template does not substantially change its shape because it comprises a heat-sensitive polymer such as N-isopropylacrylamide or copolymers thereof that can be caused to adopt a collapsed conformation in specific temperature ranges. For example, in various embodiments of such heat-sensitive polymers, the formation of the shape-static polymer template nanoparticle occurs while the polymer is maintained inside that temperature range. In various embodiments, the polymer template maintains its shape because of solvent conditions that cause it to be in a specific conformation, e.g., a polyelectrolyte that is collapsed into an approximately spheroidal conformation due to treatment of an aqueous solution of polyelectrolyte with ethanol. For example, in various embodiments of such solution condition induce shape-static formation, the formation of the shape-static polymer.

C. Nanoparticle Precursor

In various preferred embodiments of the present inventions, a chosen polymer template is provided in a suitable solvent to form a solution of a shape-static polymer template. The solvent can be water, an organic solvent, or a mixture of two or more such solvents. The addition to the solution of the nanoparticle precursor moiety induces association between the shape-static polymer template and the nanoparticle precursor. In various embodiments, the nanoparticle precursor can be substantially confined within the shape-static polymer template, e.g., when the precursor is an ionic species that undergoes ion exchange with ions in the interior of the polymer molecule. In various embodiments, the nanoparticle precursor can be substantially on the surface of the shape-static polymer template, e.g., where an ionic species associates with charged groups that are preferentially dispersed on the surface of the shape-static polymer template. In various embodiments, the nanoparticle precursor associates both in the interior and the surface of the shape-static polymer template.

In various preferred embodiments, the chosen shape-static polymer molecule comprises a polyelectrolyte provided in a suitable solvent to form a solution of the polymer. In various preferred embodiments the nanoparticle precursor moiety comprises an organic or inorganic charged ion or a combination thereof. For example, the nanoparticle precursor agent can be an ion from an organic salt, an inorganic salt, or a complex salt.

In various embodiments, the nanoparticle precursor moiety comprises a metal species-containing compound. In various embodiments of the present inventions having an elemental metal, alloy comprising a metal, or a metal species-containing compound, the metal is preferably Cd, Zn, Cu, Pb, Ag, Mn, Ni, Au, Mg, Fe, Hg, Pt or a combination thereof. In various embodiments of the present inventions having a metal species-containing compound, said compound containing said metal species preferably comprises one or more of a sulphide, selenide, telluride, chloride, bromide, iodide, oxide, hydroxide, phosphate, carbonate, sulphate, chromate and a combination thereof.

D. Nanoparticle Precursor Modification

A variety of techniques can be used in the present inventions to modify at least a portion of said nanoparticle precursor moieties to form one or more nanoparticles and thereby form a composite nanoparticle. These techniques are also referred to as "production means" herein since they are used in the production of a composite nanoparticle.

In various embodiments, the nanoparticle precursor moiety comprises at least one metal cation, complexed metal cation, or complexed metal anion. In various embodiments where the precursor moiety comprises a metal cation, complexed metal cation, or complexed metal anion, the modifying step (production means) comprises treating the cation, complexed cation, or complexed anion with γ-radiation or an agent selected from a reducing agent or an oxidizing agent to effect production of the nanoparticle comprising a metal oxide or elemental metal confined within the shape-static polymer template.

In various embodiments, the nanoparticle precursor moiety comprises at least one metal cation, complexed metal cation, or complexed metal anion, and the production means (modifying step) comprises treating the metal cation, complexed cation, or complexed anion with a suitable counterion or precursor thereof to effect production of the composite nanoparticle comprising a metal species-containing compound.

In various embodiments, the precursor moiety comprises two or more different metals. In various embodiments where the precursor moiety comprises two or more different metals, the modifying step comprises forming an alloy of two or more of the two or more metals. In various embodiments where the precursor moiety comprises two or more different metals, the modifying step comprises forming a core-shell structure of two or more of the two or more metals.

In various embodiments, the precursor moiety comprises ions selected from a cation, complexed cations, or complexed metal anions of a plurality of metals and the modifying step comprises treating the cations or complexed anions with radiation, for example, γ-radiation, alpha radiation, beta radiation, neutron radiation, etc., or an agent selected from a reducing agent or an oxidizing agent to effect production of the composite nanoparticle comprising an alloy of said metals, associated with the shape-static collapsed polymeric material. In various embodiments such treatment effects production of the nanoparticle comprising a core-shell structure of said metals, associated with the shape-static polymeric material.

Suitable techniques for modifying a nanoparticle precursor moiety to form the desired composite nanoparticle include, but are not limited to, exposure to electromagnetic radiation, chemical treatment, and combinations thereof. Examples of suitable electromagnetic radiation exposure, include, for example γ-radiation, ultraviolet radiation, infrared radiation, etc. In various embodiments, the electromagnetic radiation is coherent radiation, such as provided, e.g., by a laser, in others it is incoherent, such as provided, e.g., by a lamp. Examples of chemical treatments include, but are not limited to, contacting with an oxidizing agent, contacting with a reducing agent, addition of at least one counter ion, a compound containing the counter ion, or a precursor to the counter ion, where the counter ion is a counter ion with respect to the nanoparticle precursor moiety or a portion thereof. Generally, modification of the nanoparticle precursor moiety results in the formation of a nanoparticle that is no longer soluble within the solvent of the polymeric solution when its component ions are present at the local concentration experienced by the nanoparticle. For example, if the nanoparticle is confined within a polymer template, the dissociation-precipitation equilibrium would see an extremely high local concentration for ions dissociating off of the nanoparticle if they are also confined within the polymer template, which would force the equilibrium state to the insoluble nanoparticle.

Reaction either by reduction or oxidation of the ions, ionic precursor moieties, within the shape-static polymeric material to form the composite nanoparticles can be effected through chemical, electrochemical, or photochemical means.

In various embodiments, the nanoparticle precursor moiety comprises an anion, and the modifying step comprises treating the anion with a suitable metal counterion or precursor thereof to effect production of the composite nanoparticle comprising a metal species-containing compound.

In various aspects, the modifying step comprises use of a suitable counterion or precursor thereof to effect production of a semiconductor nanoparticle or composite nanoparticle.

In a various aspects, the modifying step comprises use of a suitable counterion or precursor thereof to effect production of a composite nanoparticle comprising a complex salt.

In a various aspects, modifying step comprises use of a suitable counterion or precursor thereof to effect production of a nanoparticle comprising a hydroxide. In a preferred aspect, the hydroxide may be subsequently heated to convert the hydroxide to an oxide.

E. Shape-Static Composite Nanoparticles and Nanoparticles

A wide variety of molecules can be used to form the nanoparticle portion of the shape-static composite nanoparticle including, but not limited to, organic or inorganic charged ions or a combination thereof. In various preferred embodiments, the nanoparticle comprises an elemental metal, alloy comprising a metal, or a metal species-containing compound, the metal is preferably Cd, Zn, Cu, Pb, Ag, Mn, Ni, Au, Mg, Fe, Hg, Pt or a combination or alloy of one or more thereof. As used herein, by the term "metal species-containing compound" is meant a compound containing a metal or metalloid in any valence state. In various preferred embodiments, the nanoparticle comprises semiconductor crystals, including, but not limited to, CdS, CdSe, CdTe, ZnS, ZnSe, ZnTe, PbS, PbSe, PbTe, CuI, HgS, HgSe, and HgTe. These semiconductors can be ternary or quaternary semiconductors, including, but not limited to, CdTe/S, CdSe/S, CdTe/Se, Cd/ZnTe, Cd/ZnSe/Te, and the like. In various preferred embodiments, the nanoparticle comprises oxides, such as ZnO, $SnO_2$, CoO, NiO, CdO, $InO_2$, and the like. In various preferred embodiments, the nanoparticle comprises more complex systems, including alloys such as Ag/Au, Ag/Cu, Au/Cu, phosphates such as $LiFePO_4$, chromates such as $PbCrO_4$, and the like. In various preferred embodiments, the nanoparticle comprises organic species such as methylene blue and the like.

The resultant nanoparticles can be, for example, semiconductor crystals, including, but not limited to, CdS, CdSe, CdTe, ZnS, ZnSe, ZnTe, PbS, PbSe, PbTe, CuI, HgS, HgSe, and HgTe. The nanoparticles can also be metal alloys.

In various embodiments, a composite nanoparticle formed by a method of the present inventions has a mean diameter in the range between about 1 nanometer (nm) to about 100 nm. In various embodiments, the composite nanoparticle has a mean diameter in one or more of the ranges between: (a) about 1 nm to about 10 nm; (b) about 10 nm to about 30 nm; (c) about 15 nm to about 50 nm; and (d) about 50 nm to about 100 nm). It is to be understood that the term "mean diameter" is not meant to imply any sort of specific symmetry (e.g., spherical, ellipsoidal, etc.) of a composite nanoparticle.

In various embodiments, the composite nanoparticle, formed from a nanoparticle precursor moiety, comprises a metal species-containing compound.

In various embodiments, the composite nanoparticle, formed from a nanoparticle precursor moiety, comprises an alloy of two or more different metals. In various embodiments where the nanoparticle precursor moiety comprises two or more different metals, the modifying step comprises forming an alloy of two or more of the two or more metals.

In various embodiments of the present inventions having an elemental metal, alloy comprising a metal, or a metal species-containing compound, the metal is preferably Cd, Zn, Cu, Pb, Ag, Mn, Ni, Au, Mg, Fe, Hg, Pt or a combination thereof.

In various embodiments of the present inventions having a metal species-containing compound, said compound containing said metal species preferably comprises one or more of a sulphide, selenide, telluride, chloride, bromide, iodide, oxide, hydroxide, phosphate, carbonate, sulphate, chromate and a combination thereof.

In various aspects, the present inventions provide methods for producing a composite nanoparticle comprising the steps of: (a) providing a shape-static polymer template with a size in the range between about 1 nanometer (nm) to about 100 nanometers (nm); (b) incorporating one or more nanoparticle precursor moieties with the shape-static polymer template; and (c) modifying at least a portion of the one or more nanoparticle precursor moieties to form one or more nanoparticles and thereby form a composite nanoparticle. The polymer portion of the resultant composite nanoparticle is substantially shape-static. For example, the polymer template does not substantially change its size and does not substantially change its shape when a composite nanoparticle is formed from said nanoparticle precursor associated with the polymer template.

In various aspects, the present inventions provide methods for producing a composite nanoparticle comprising the steps of: (a) providing a shape-static polymer template with a size in the range between about 1 nanometer (nm) to about 100 nanometers (nm); (b) incorporating one or more nanoparticle precursor moieties with the shape-static polymer template; (c) modifying at least a portion of the one or more nanoparticle precursor moieties to form one or more nanoparticles and thereby form a composite nanoparticle; and (d) pyrolysing said composite nanoparticle to form a nanoparticle material. In various embodiments, the pyrolysis conditions are controlled such that the nanoparticle material formed comprises at least a partially carbon-coated nanoparticle.

In various embodiments, the present inventions provide methods for producing a carbon-coated metal nanoparticle comprising incompletely pyrolysing the composite nanoparticle prepared by a method of the present inventions described herein, wherein the metal nanoparticle is selected from an elemental metal, an alloy comprising the metal with at least one other metal, and a metal species-containing compound, at a temperature to effect production of the carbon-coated metal nanoparticle.

In various aspects, the present inventions provide methods for producing a composite nanoparticle comprising the steps of: (a) providing a shape-static polymer template with a size in the range between about 1 nanometer (nm) to about 100 nanometers (nm); (b) incorporating one or more nanoparticle precursor moieties with the shape-static polymer template; (c) modifying at least a portion of the one or more nanoparticle precursor moieties to form one or more nanoparticles and thereby form a composite nanoparticle; and (d) treating said composite nanoparticle with high-energy radiation to form a nanoparticle material. In various embodiments, the radiation conditions are controlled such that the nanoparticle material formed comprises fragments of the polymer template.

In various embodiments, the present inventions provide methods for producing a metal nanoparticle, comprising irradiating the composite nanoparticle prepared by a method of the present inventions described herein, wherein the metal nanoparticle is an elemental metal, an alloy comprising the metal with at least one other metal, or a metal species-containing compound, at a energy flux effective to substantially remove the polymeric material.

In various aspects, the present inventions provide composite nanoparticles when made by a method or process of one of the inventions described herein.

In various aspects, the present inventions provide non-confined and wholly or partially polymer fragment-coated metal nanoparticles when made by methods of the present inventions described herein.

Various embodiments of the present inventions can be of value in the production of semiconductor nanoparticles, including, for example, quantum dots such as CdSe, CdS, CdTe, and others. Various embodiments of the present inventions can be of value in the production of complex salts, such as $LiFePO_4$, and oxide particles, such as $Fe_2O_3$.

The aforesaid composite nanoparticles comprising a metal species-containing compound, a complex salt, hydroxide, or oxide, a semiconductor entity, can be, in various embodiments, effectively pyrolyzed to substantially remove the polymeric material, or to only partially remove the polymeric material to produce, for example, a wholly or partially carbon-coated nanoparticle.

Thus, various embodiments of the present inventions relate to methods of making composite nanoparticles and nanoparticles that may have a wide variety of applications in a variety of sectors, including, but not limited to, biology, analytical and combinatorial chemistry, catalysis, energy and diagnostics. By utilizing starting materials that are readily soluble in water, the present inventions, in various embodiments, can provide nanoparticles and composite nanoparticles having unique characteristics applicable in the aforesaid sectors, which nanoparticles may be water soluble.

The synthesis routes of various embodiments of the present inventions, include, but are not limited to, synthesis in a "one pot" system in an aqueous medium. The particle size can be controlled, for example, by varying the size of the shape-static polymer, the degree of internal cross-linking, solution conditions and the like. The polymer coat can be chosen to have desirable functional groups that can impart desirable properties, for example, having the capability for attachment to molecules, such as proteins or to enhance or decrease the sticking to substrates.

In various embodiments, the present inventions provide methods for making water-dispersable composite nanoparticles with inherent chemical functional groups that can be reacted with complementary functional groups on other molecules. Water-dispersable, in this context, refers to the formation of composite nanoparticles that can be prevented from aggregation in aqueous solution through adjustment of solution conditions.

One preferred embodiment of the present inventions involves the formation of composite nanoparticles by the addition of ions that induce precipitate formation of the nanoparticle precursor within or on the surface of the shape-static polymer. As used herein, "precipitation" of a confined ion refers to modification of the ion to a compound that is substantially insoluble in the solvent of the polymeric solution.

In various embodiments, functional groups of the polymeric material of the polymer template can be used for conjugating the composite nanoparticles to other molecules containing complementary functional groups. These molecules can be any member of affinity-binding pairs such as antigen-antibody, DNA-protein, DNA-DNA, DNA-RNA, biotin-avidin, hapten-antihapten, protein-protein, enzyme-substrate and combinations thereof. These molecules can also be protein, ligand, oligonucleotide, aptamer, carbohydrate, lipid, or other nanoparticles. An example is the conjugation of poly(acrylic acid)-encased nanoparticles to proteins through amide bond formation between amine groups on proteins and the carboxylic acid groups on poly acrylic acid (PAA).

A fraction of the functional groups of the polyelectrolyte polymer can also be modified to convert them to other functional groups that can be used for conjugation. For example, a hetero bi-functional molecule containing an amine group and a latent thiol group can be reacted with nanoparticles comprising poly(acrylic acid) through amide bond formation thereby converting the carboxylic acid to a thiol group. The thiol group can be used for conjugation to other molecules containing thiol-reactive groups.

The wide variety of potential applications for the composite nanoparticles and nanoparticles, produced by the methods of the present invention include, but are not limited to, the absorption of light energy selected from the group consisting of UV, visible, and IR light, wherein the composite nanoparticle or nanoparticle are used as pigments or are incorporated into an optical device. In various embodiments, after absorbing light energy the composite nanoparticle may be capable of emitting light.

In various embodiments of the present inventions, provided are methods wherein the polymeric material is conjugated to molecules containing functional groups for binding to complementary binding partners to form an affinity-binding pair selected from the group having an enzyme-substrate, antigen-antibody, DNA-DNA, DNA-RNA, biotin-avidin, hapten-antihapten and combinations thereof. Preferably, the molecules are selected from the group consisting of protein, ligand, oligonucleotide, aptamer, and other nanoparticles.

In various embodiments, a composite nanoparticle of the present inventions may be used, e.g., to enhance spectroscopic techniques, including vibrational spectroscopy.

In various embodiments, provided are methods wherein the composite nanoparticles are further assembled on a surface of a substrate using layer-by-layer assembly or further aggregated into three-dimensional systems of composite nanoparticles, whereby the three-dimensional systems are created on a surface. In various embodiments this substrate is a film.

Accordingly, in various aspects the present inventions provide a coated substrate having a plurality of layers of composite nanoparticles as herein described interspersed between adjacent layers of oppositely charged compounds.

In various embodiments, a coated substrate as herein described is preferably coated, with a composite nanoparticle of CdS/PAA and the oppositely charged compound is poly(allylamine) hydrochloride (PAH).

In various embodiments, the present inventions provide use of a composite nanoparticle as herein described in the production of a multi-layered coated substrate. This substrate could be of value, for example, as one or more of: (a) a solid substrate comprising catalytic or otherwise reactive nanoparticles; and (b) an optical filter or as an element in an optical device where the incorporated composite nanoparticles have useful properties.

In various embodiments, the compounds according to the present inventions could be of value as semiconductor materials, for example, as quantum dots.

When considering various practical applications of the present inventions, there are three main functions of having a nanoparticle that is associated with a shape-static polymer template. One function can be to modify and/or control the interactions of the nanoparticles with each other and/or with a solvent, e.g., to provide certain solubility characteristics or to prevent aggregation. A second function can be to prevent transport of other materials dissolved in the nanoparticle environment (e.g., tissue, solvent, air, etc.) to the nanoparticle surface, which, e.g., can often cause deactivation of nanoparticle properties, such as, e.g., fluorescence. A third function can be to prevent release of the material comprising the nanoparticle into the nanoparticle environment (e.g., tissue, solvent, air, etc.), e.g., to prevent the nanoparticle from decomposing or dissolving into its component parts, eliciting a toxic response, etc. It is to be understood that the second and third functions can apply to nanoparticles in gaseous systems as wells as those in a liquid environment.

EXAMPLES

Various aspects and embodiments of the present inventions may be further understood in light of the following examples, which are not exhaustive and which should not be construed as limiting the scope of the present inventions in any way.

Example 1

Production of Composite Nanoparticles Using Reduction Inside Shape-Static Polymer Templates and Dialysis Against Acid The sodium salt of poly(acrylic) acid of molecular weight of 1,200,000, was used to produce nanoparticles. 100 mL of 20 mM aqueous sodium nitrate was added to 100 g of 0.2% (w/v) aqueous basic (pH 6.8) polyacrylic acid with 0.01% polystyrene sulfonate (MW 70,000). The resultant solution was irradiated in a 400 mL glass beaker covered with a quartz disk with 254 nm UV lamp for 2 h. During irradiation the solution was stirred. This solution will be referred to as $Na^+$/PAA-PSS. An aliquot of this solution was taken off and transferred into a dialysis tube with a MW cutoff of 12000-14000. The transparent yellowish solution was dialyzed against 980 mM aqueous silver nitrate for 2.5 days. This solution is referred to as $Ag^+$/PAA-PSS. The solution was transferred into a 50 mL glass beaker fitted with a stirring bar and 7 mg solid sodium borohydride was added. The solution immediately changed color to dark brown. The solution was stirred for 10 minutes and was stored in a brown vial at 4° C. The resulting $Ag^+$/PAA-PSS composite nanoparticles were characterized by UV-Vis spectroscopy, which is shown in FIG. 1.

Example 2

Production of Composite Nanoparticles Using Oxidation Inside Shape-Static Polymer Templates A $Na^+$/PAA-PSS particle was produced as described in example 1. The resulting salt was dialyzed against aqueous zinc nitrate to form the zinc salt of the acrylic acid groups in the polymer particles. The zinc nitrate concentration was chosen so that the ratio of $Zn^{2+}$:acrylic acid groups in the polymer was approximately 0.3:1 M ratio. The resulting $Zn^{2+}$/PAA was adjusted to pH 11 using 0.1M NaOH and then refluxed for one hour. The resulting ZnO/PAA composite nanoparticles were characterized using electron microscopy and x-ray diffraction.

Example 3

Figure 2:
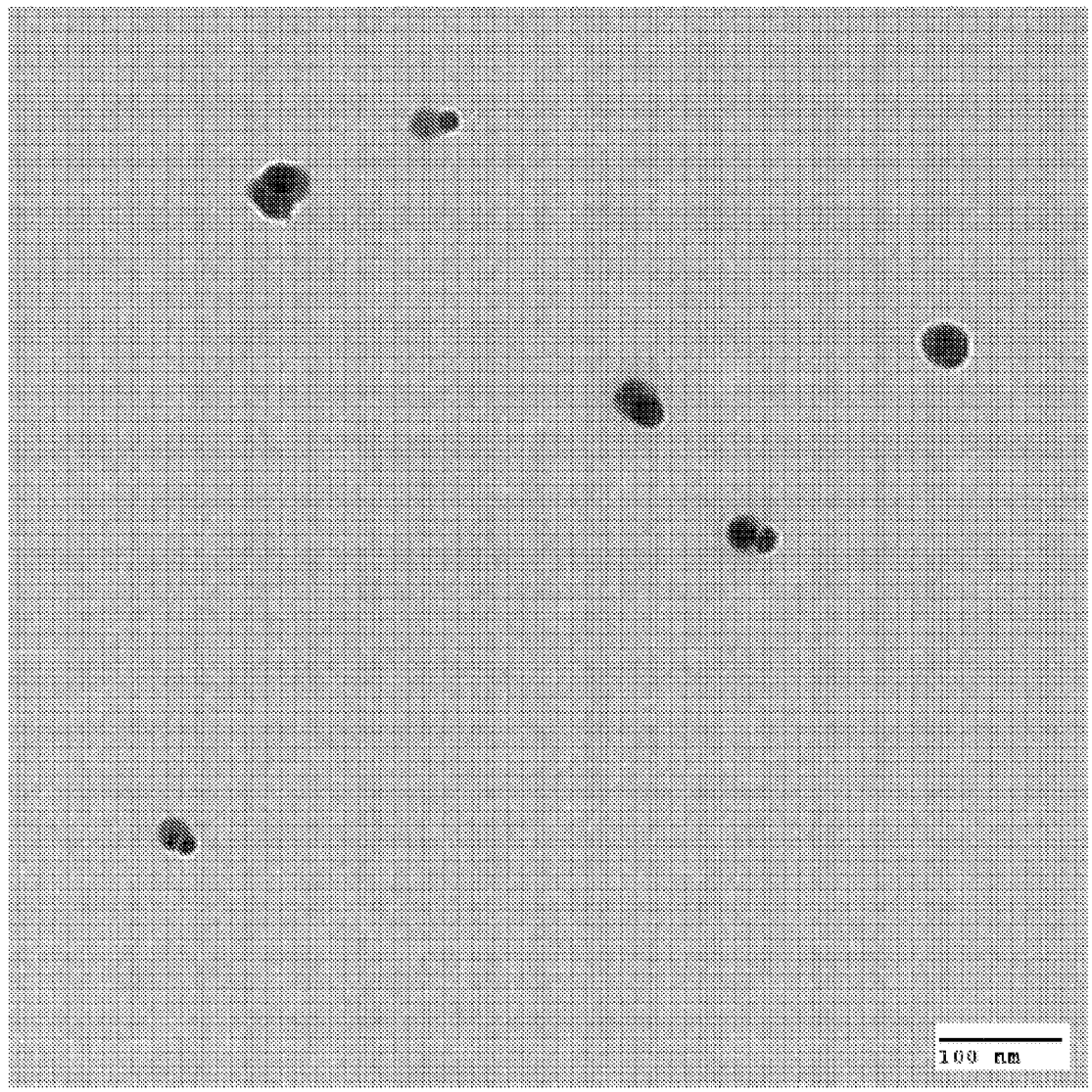
FIG. 2: A TEM image of silver iodide nanoparticles prepared according to the present invention, showing nanoparticles formed inside and on the surface of a polymer template.
Figure 3:
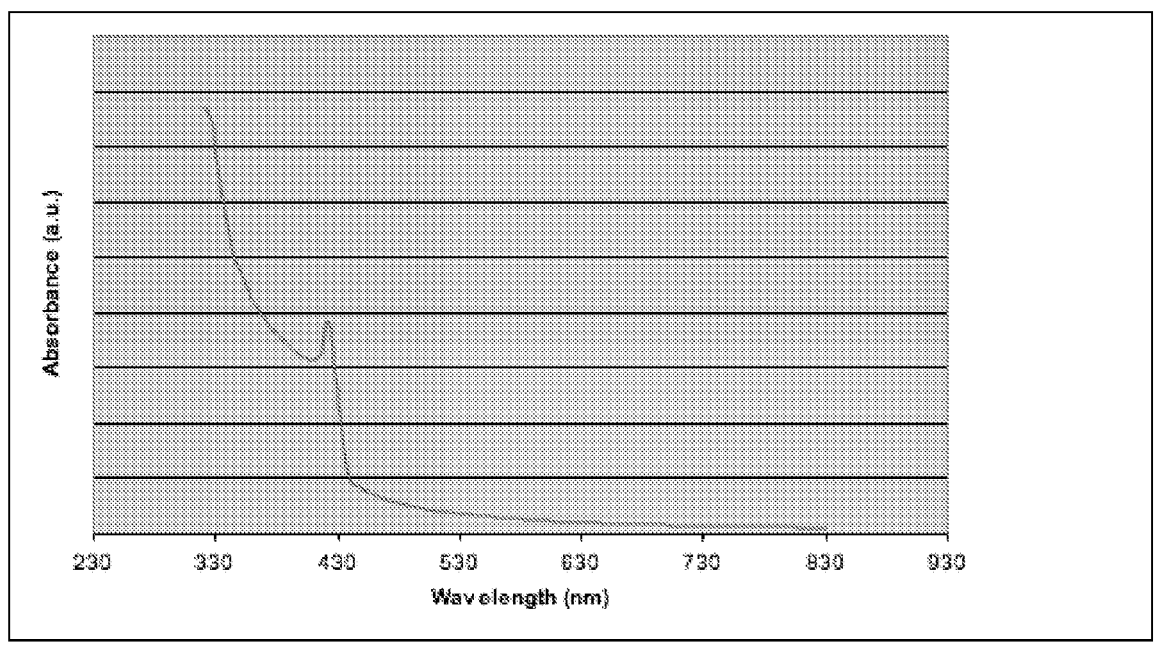
FIG. 3: The UV-Vis absorbance spectrum of silver iodide nanoparticles prepared according to the present invention, showing a very narrow absorbance peak.

Production of Composite Nanoparticles Using Precipitation Inside and on the Surface of Shape-Static Polymer Templates A $Ag^+$/PAA-PSS particle was produced substantially as described in example 1. The resulting solution was transferred into a 50 mL glass beaker fitted with a stirring bar and a solution of 140 mg of sodium iodide in 7 mL deionized water was added dropwise. The resulting solution was stirred for 20 minutes and then centrifuged to separate the fine precipitate that appeared after adding the NaI solution. The yellowish supernatant produced was imaged using TEM to confirm the existence of nanoparticles (FIG. 2) and a UV-Vis spectra was taken (FIG. 3).

Example 4

Production of Composite Nanoparticles Using Precipitation Outside Shape-Static Polymer Templates A CdTe/PAA particle was produced as described in Example 16 of Goh et al, PCT/CA2006/001686. To this solution was added a small amount of 0.60 mM Zn $Zn(NO_3)_2$ so that the total number of $Zn^{2+}$ ions was approximately 1-10% of the number of acrylic acid groups in solution. The resulting $Zn^{2+}$/$Cd^{2+}$/PAA solution was adjusted to pH 11 using 0.1M NaOH and then refluxed for one hour. Confirmation of the formation of ZnO nanoparticles on the outside of the polymer templates was obtained using electron microscopy and x-ray diffraction.

All literature and similar material cited in this application, including, patents, patent applications, articles, books, treatises, dissertations and web pages, regardless of the format of such literature and similar materials, are expressly incorporated by reference in their entirety. In the event that one or more of the incorporated literature and similar materials differs from or contradicts this application, including defined terms, term usage, described techniques, or the like, this application controls.

The section headings used herein are for organizational purposes only and are not to be construed as limiting the subject matter described in any way.

While the present inventions have been described in conjunction with various embodiments and examples, it is not intended that the present inventions be limited to such embodiments or examples. On the contrary, the present inventions encompass various alternatives, modifications, and equivalents, as will be appreciated by those of skill in the art. Accordingly, the descriptions, methods and diagrams of should not be read as limited to the described order of elements unless stated to that effect.

The invention claimed is:

1. A method for producing composite nanoparticles comprising the steps of:
   incorporating a nanoparticle precursor moiety with a shape-static polymer template wherein the template comprises a discrete cross-linked and collapsed polymer and has a size in the range between about 1 nm to about 100 nm; and
   oxidizing the precursor moiety to form a composite nanoparticle comprising one or more of an inorganic oxide and hydroxide nanoparticle.

2. The method of claim 1, where the shape-static polymer template comprises more than one type of monomer.

3. The method of claim 1, where the shape-static polymer template comprises a combination of two or more different polymer molecules.

4. The method of claim 1, where the shape-static polymer template comprises monomers with ionizable or ionized groups.

5. The method of claim 1, where at least about half of the nanoparticle precursor moiety is confined within the shape-static polymer template.

6. The method of claim 1, where at least about half of the nanoparticle precursor moiety is on the surface of the shape-static polymer template.

7. The method of claim 1, where the nanoparticle precursor moiety comprises at least one metal species-containing compound.

\* \* \* \* \*